M. Roberts,
Gage Lathe,
N°14,941. Patented May 20, 1856.
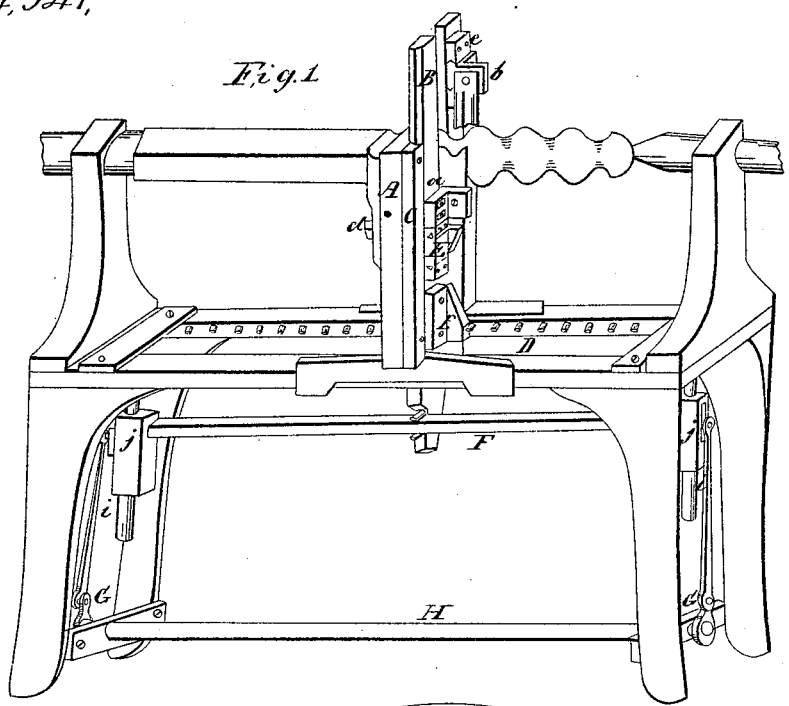
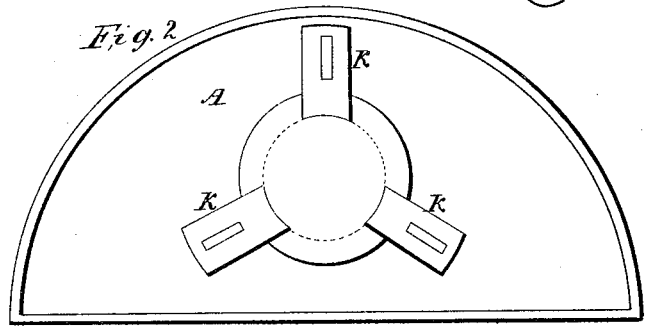
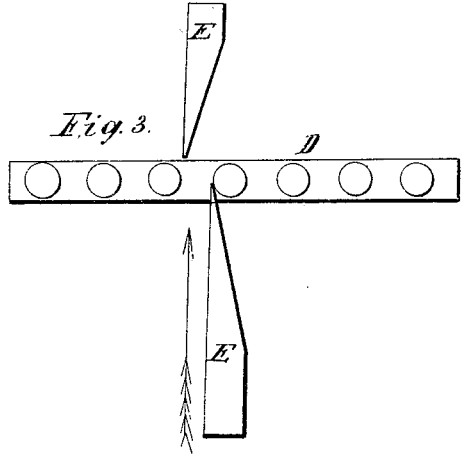

UNITED STATES PATENT OFFICE.

MILTON ROBERTS, OF BELFAST, MAINE, ASSIGNOR TO M. ROBERTS, ISAAC ROBERTS, AND ISAAC N. FELCH, ALL OF BELFAST, MAINE.

LATHE ATTACHMENT FOR TURNING IRREGULAR FORMS.

Specification of Letters Patent No. 14,941, dated May 20, 1856.

*To all whom it may concern:*

Be it known that I, MILTON ROBERTS, of Belfast, in the county of Waldo and State of Maine, have invented a new and useful Machine or an Improvement in Lathes, called the "Automatic Lathe," for Turning Figured Woodwork, of which the following is a full and exact description.

This invention consists in the movable head A, attached to a common lathe bench, with a slide B, moving transversely between the guides C. This transverse motion is produced by the crank G, G,—the cutter slide being loosely attached to the bar F, by pins, so that the head B, can slide horizontally along the bar F. The horizontal motion is produced by two inclined planes E, E, Figure 3, so that in the upward motion the lower inclined plane presses against a tooth in the rack D, and moves the head so that the upper inclined plane goes by the next tooth; and the downward motion throws the head A, forward, so that the lower inclined plane goes by another tooth in the rack D, and so on continually, as represented in the annexed drawings which form a part of this specification.

The cutter $a$ Fig. 1, is so attached to the frame B, in the upward motion, that the straight part of the inclined plane E, shall be between the teeth in the rack D, when the tool $a$ is cutting, to prevent the head A, from moving forward at that moment.

In order to cut a different pattern on the same piece, the cutter $b$, on the opposite side of the slide B, is attached, so as to be moved up at will toward the piece when the slide B, is in motion, until the figure is finished, when it is returned and the cutter $a$ goes on to perform its work.

To turn different sizes, the head is so constructed with three dies K, K, K, as represented in Fig. 2, movable to the size required; also the cutters $a$ and $b$, Fig. 1, are made to pass to and by the wood, arranged in salient angles making a draw cut as claimed in Milton Robert's patent dated Augt. 23, 1853.

I claim—

Automatic lathe attachment for turning figured wood work, substantially a transverse and longitudinal movement produced by cranks G, G, and inclined planes E, E, or their equivalents, and tooth rack D.

In witness whereof, I have hereunto subscribed my name the 28th day of March, A. D. 1856.

MILTON ROBERTS. [L. S.]

In the presence of—
   W. H. HOUSTON,
   F. A. LEWIS.